FIG. 3
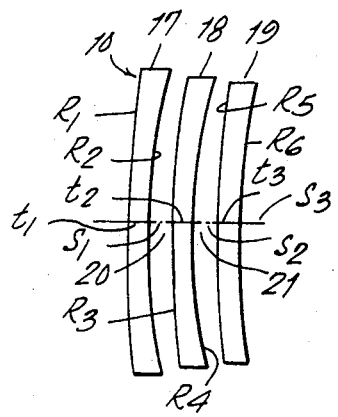
VARIATOR
FIG. 4
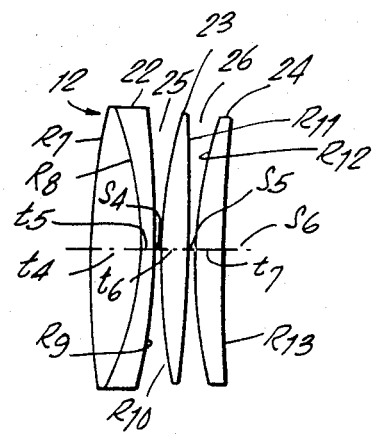
ERECTOR
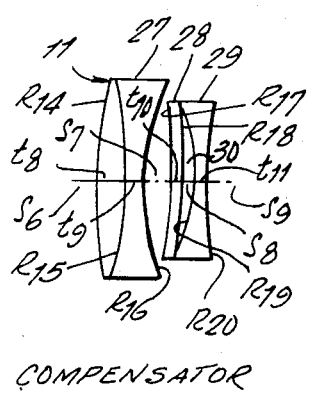
COMPENSATOR
FIG. 5
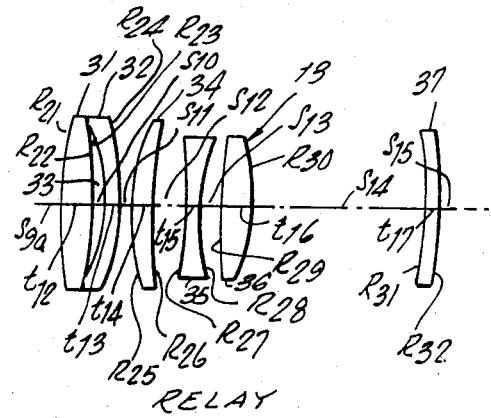
RELAY
FIG. 6
INVENTOR.
FRANK G. BACK
BY Albert Kromman
ATTORNEY

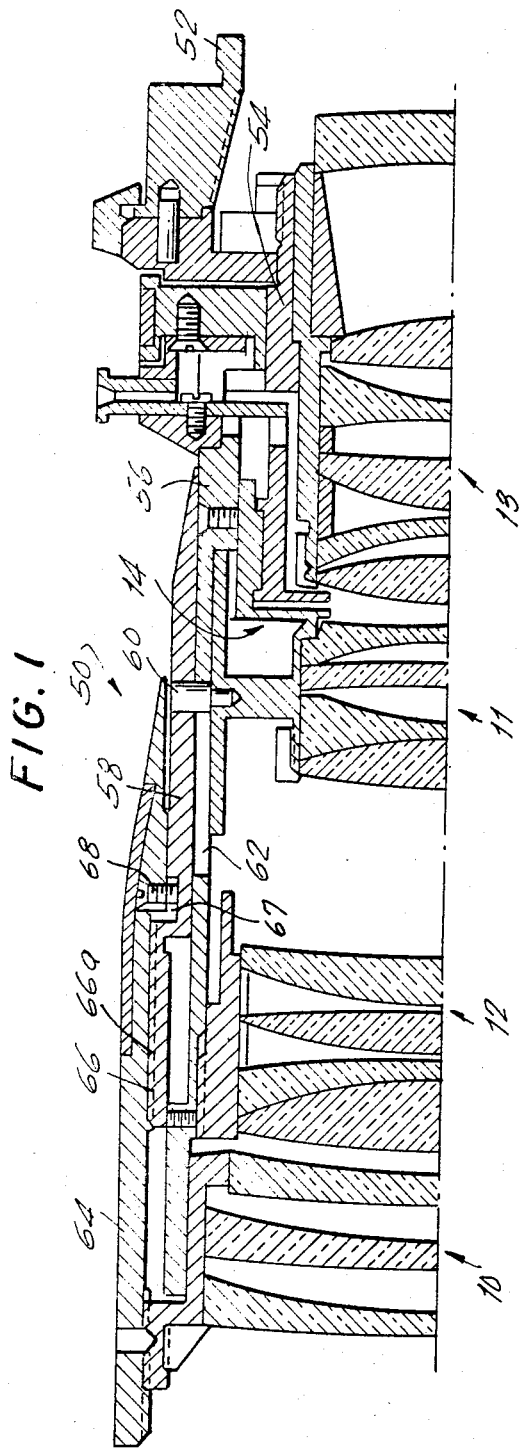
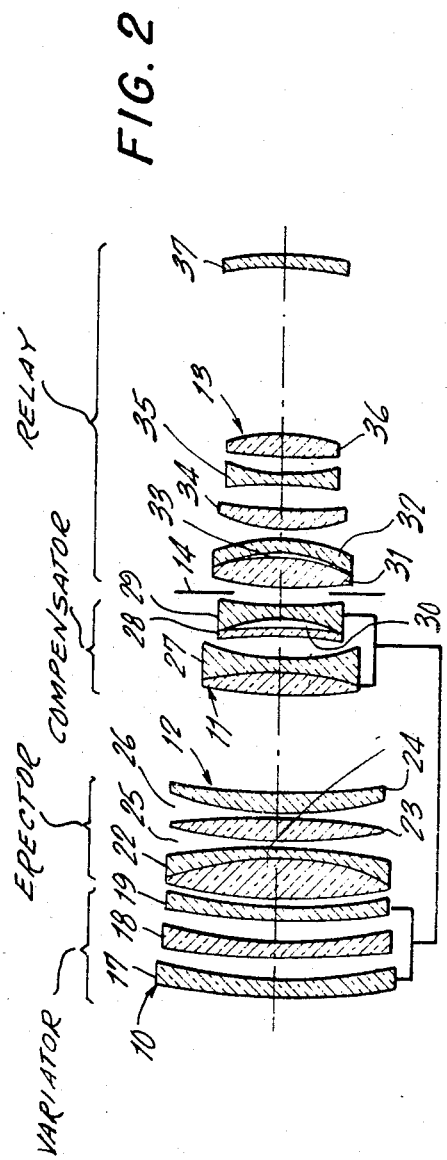

United States Patent Office 3,523,719
Patented Aug. 11, 1970

3,523,719
MACRO OBJECTIVE FOR SINGLE LENS REFLEX CAMERA WITH FOCAL PLANE SHUTTER
Frank G. Back, 55 Sea Cliff Ave.,
Glen Cove, N.Y. 11542
Filed Mar. 29, 1968, Ser. No. 717,111
Int. Cl. G02b 15/14
U.S. Cl. 350—184                                    1 Claim

ABSTRACT OF THE DISCLOSURE

A macro objective for a single lens reflex camera using a focal plane shutter which combines an optically compensated varifocal lens system of a movable first lens or variator and a last lens element at least 25% larger than the diameter of the iris diaphragm.

BACKGROUND OF THE INVENTION

A macro objective is a lens which permits taking photographs with an imaging scale of up to about 1:2. Macro objectives known to the art distinguish themselves from normal photographic lenses principally by the construction of their mounts. The mount is designed in such a way that the objective can be moved to a great distance from the film; for this purpose a focusing thread of great axial length is required. The known macro objectives have the disadvantage that the required exposure time changes, depending on the distance of the lens from the film. A further disadvantage is the requirement that, to obtain a certain imaging scale, a certain distance between lens and object has to be kept. This restriction can lead to difficulties for objects which are not easily accessible.

SUMMARY OF THE INVENTION

It is the purpose of the present invention to create a macro objective for single lens reflex cameras employing focal plane shutters, which requires a shorter focusing movement than known macro objectives, in which the exposure time is independent of the focusing distance, and which permits the imaging scale to be changed without changing the object distance. This purpose is achieved by the use of a varifocal lens for macro photography.

A varifocal lens as is well known to the art may comprise the following lens groups, enumerated in sequence in the direction of the incoming light:
   A movable variator of negative power,
   A stationary erector of positive power,
   A movable compensator of negative power, coupled to and movable with the variator,
   An iris diaphragm, and
   A stationary relay system.

Such a zoom lens is described in U.S. Pat. No. 3,259,013.

In the present invention such a zoom lens has been modified so that the variator can be moved independently of the compensator for focusing purposes. In addition, the last lens of the relay is of a diameter which is at least 25% larger than the diameter of the iris diaphragm.

DESCRIPTION OF THE DRAWINGS

In the accompanying drawings forming part hereof there is illustrated one form of embodiment of the present invention.

FIG. 1 is a view in longitudinal cross section through a lens according to the present invention, FIG. 2 is a view in longitudinal cross section showing the arrangement of the lens elements of the present invention, FIGS. 3-6 are diagrammatic views of the several lens groups, variator, erector, compensator and relay shown in FIGS. 1 and 2.

DESCRIPTION OF THE PREFERRED EMBODIMENTS

Referring to the drawings and particularly to FIG. 1, the lens mount for the macro objective is designated as 50. This lens mount 50 is connected to a single lens reflex camera, not shown, by an adapter 52. Rigidly connected to the adapter 52 is a barrel 54 of the mount 50. The barrel 54 carries a relay 13 and an iris stop 14. A guide barrel 56 is rigidly connected to the outside of barrel 54. The guide barrel 56 carries a stationary erector 12 therein.

Mounted on the guide barrel 56 is a slidable sleeve 58 which can move longitudinally but cannot be rotated in relation to the guide barrel 56. The sleeve 58 is prevented from rotating by a pin 60 in an elongated guiding slot 62 in the barrel 56. Secured to the slidable sleeve 58 by means of the pin 60 is a compensator 11. The compensator 11 can thus be moved with the sliding sleeve 58. Coupled to the slidable sleeve 58 is a tubular extension 64 having an internal multiple thread 66. The thread 66 engages a corresponding external thread 66a on the sliding sleeve 58, a groove 67 in the slidable sleeve 58 and a screw 68 carried by the extension 64 and extending into the groove 67 limits the travel of the tubular extension 64 upon the sleeve 58. The tubular extension 64 carries the variator 10.

The construction of the lens mount as described so far permits of the movement of the compensator 11 and the variator 10 jointly relative to the erector 12, the stationary iris diaphragm 14 and the stationary relay 13. It is furthermore possible to move the variator 10 in an axial direction with respect to the compensator 11 by rotating the tubular extension 64 relative to the slidable sleeve 58. Both movements can be affected simultaneously or independently of each other merely by manipulating the tubular extension 64.

The optical system of the present device is shown in detail in FIGS. 2–6. The variator 10 best shown in FIG. 3, consists of three dispersive lenses, 17, 18 and 19, which enclose two airspaces, 20 and 21.

The erector 12 best shown in FIG. 4, consists of a cemented doublet 22, followed by a bi-convex lens 23 and a positive meniscus 24. Between the lenses 22, 23 and 24 are air spaces 25 and 26.

The compensator 11 best shown in FIG. 5 consists of a dispersive cemented doublet 27, followed by a negative meniscus 28 which is concave towards the object. Lens 28 is followed by a bi-concave negative lens 29. Between lens 28 and 29 is an air space 30.

Compensator 11 is followed by the iris stop 14, which in turn is followed by the relay 13. Relay 13, best shown in FIG. 6, comprises a lens group of a bi-convex lens 31 followed by a negative meniscus 32. Between lenses 31 and 32 is an air space 33. This lens group is followed by a lens group 34, 35, and 36 which in turn, is followed by a negative meniscus 37.

The travel of the slidable sleeve 58 is 14.4 mm., the axial movement of the tubular extension 64 is 9 mm.

The above described lens system is free from coma for all positions. This freedom from coma permits of a diameter for lens 37 of at least 25%, and preferably 30% larger than the diameter of the iris diaphragm 14, because no coma stop is required. The size of the rear lens 37 and the elimination of the coma stop are necessary to avoid vignetting which would otherwise occur by reason of the movement of the variator in relation to the compensator.

The inequalities given in U.S. Pat. No. 3,259,013 for the power relations of the several components are also applicable to the present objective:

If the power of the whole system in its short focal position is designated by the symbol $\Phi$, both the air lenses 20, 21 in the variator must have a power of more than one quarter but less than one half of the aforesaid absolute minimum power, or written as an inequality as follows:

$$[¼\Phi] < \phi 20 < [½\Phi]$$
$$[¼\Phi] < \phi 21 < [½\Phi]$$

where the symbol $\phi$ indicates the power of the element.

The power of the two bi-concave aid lenses 25, 26 in the erector 12 is more than one half but less than equal to the aforementioned total power of the system in its minimum position or:

$$½\Phi < \phi 25 < \Phi$$
$$½\Phi < \phi 26 < \Phi$$

The power of the air lens 30 between the lenses 28, 29 in the compensator is more than equal to but less than one and one half times the absolute power of the whole system in its minimum position, or:

$$[\Phi] < \phi 30 < [1½\Phi]$$

The power of the air lens 33 between the lenses 31, 32 in the relay is more than equal to but less than one and one half times the absolute total power of the whole system in its short focal position, or:

$$[\Phi] < \phi 33 < [1½\Phi]$$

The lens 34 which is a positive meniscus has a ratio of its front to its rear surface of more than 0.05 but less than 0.3. The element 35 is a bi-concave negative lens with an absolute ratio of its front surface $R_{27}$ to the rear surface $R_{28}$ of more than 3.00 but less than 15.00. The last lens 36 of the front radius $R_{29}$ to its rear $R_{30}$ of more than 3.00 but less than 6.00. The negative rear element of the telephoto system has a ratio of its radii $R_{31}$ to $R_{22}$ of more than .30 but less than .60 or:

$$0.05 < \frac{R_{25}}{R_{26}} < 0.30$$

$$3.00 < \frac{R_{27}}{R_{28}} < 15.00$$

$$3.00 < \frac{R_{29}}{R_{30}} < 6.00$$

$$.30 < \frac{R_{31}}{R_{32}} < 0.60$$

The following table gives the optical characteristics of one form of a macro objective lens system as described above.

| Lens No. | Radius (R) mm. | Thickness (t), air spacing (s) | Glass Cat. Ref. | Index No. $n_D$ | Dispersion $\nu$ |
|---|---|---|---|---|---|
| VARIATOR | | | | | |
| 17 | $R_1$=716.03<br>$R_2$=78.03 | $t_1$=2.50<br>$s_1$=3.50 | LaF-2 | 1.744 | 44.90 |
| 18 | $R_3$=379.86<br>$R_4$=89.03 | $t_2$=2.50<br>$s_2$=3.50 | LaF-2 | 1.744 | 44.90 |
| 19 | $R_5$=465.62<br>$R_6$=118.41 | $t_3$=2.50<br>$s_3$=1.70 max. to 16.10 min. | LaF-2 | 1.744 | 44.90 |
| ERECTOR | | | | | |
| 22 | $R_7$=103.25<br>$R_8$=-38.53<br>$R_9$=-140.37 | $t_4$=7.00<br>$t_5$=1.50 | LaK-10<br>SF-18 | 1.720<br>1.7215 | 50.31<br>29.28 |
| 23 | $R_{10}$=63.55<br>$R_{11}$=-259.21 | $s_4$=.25<br>$t_6$=4.00<br>$s_5$=.25 | LaK-9 | 1.691 | 54.79 |
| 24 | $R_{12}$=54.09<br>$R_{13}$=272.04 | $t_7$=4.20<br>$s_6$=15.43 max. to 1.03 min. | LaK-9 | 1.691 | 54.79 |
| COMPENSATOR | | | | | |
| 27 | $R_{14}$=86.41<br>$R_{15}$=-35.64<br>$R_{16}$=-26.29 | $t_8$=4.50<br>$t_9$=1.50<br>$s_7$=3.50 | SF-18<br>LaK-10 | 1.7215<br>1.720 | 29.28<br>50.31 |
| 28 | $R_{17}$=-96.50<br>$R_{18}$=-763.85 | $t_{10}$=1.60<br>$s_8$=1.62 | LaSF-2 | 1.8374 | 43.47 |
| 29 | $R_{19}$=-32.28<br>$R_{20}$=-1354.21 | $t_{11}$=1.60<br>$s_9$=1.00 max. to 15.40 min. | LaSF-2 | 1.8374 | 43.47 |
| IRIS | | | | | |
| | | $S_{9a}$=1.00 | | | |
| RELAY | | | | | |
| 31 | $R_{21}$=40.11<br>$R_{22}$=-35.96 | $t_{12}$=5.00<br>$s_{10}$=1.40 | BK-7 | 1.52168 | 64.19 |
| 32 | $R_{23}$=-20.55<br>$R_{24}$=-30.40 | $t_{13}$=2.00<br>$s_{11}$=.50 | SF-18 | 1.7215 | 29.28 |
| 34 | $R_{25}$=24.30<br>$R_{26}$=225.28 | $t_{14}$=4.50<br>$s_{12}$=3.09 | SK-16 | 1.6204 | 60.29 |
| 35 | $R_{27}$=-166.62<br>$R_{28}$=21.44 | $t_{15}$=2.00<br>$s_{13}$=3.00 | LaK-10 | 1.720 | 50.31 |
| 36 | $R_{29}$=111.10<br>$R_{30}$=-25.24 | $t_{16}$=4.50<br>$s_{14}$=23.00 | SK-16 | 1.6204 | 60.29 |
| 37 | $R_{31}$=-34.42<br>$R_{32}$=-68.45 | $t_{17}$=2.00<br>$s_{15}$=2.40 | SF-18 | 1.7215 | 29.28 |

EFL=50–121.00 mm.
BFL=39.17 mm. $R_1$–$R_{32}$=the surfaces of the lens system in the order of the incident ray.

In the above table:

LaF=Lanthanum Flint
LaK=Lanthanum Crown
SF=Dense Flint
LaSF=Dense Lanthanum Flint
BK=Borosilicate Crown
SK=Dense Crown With a lens according to the present invention, it is possible to decrease the object distance to 18 cm. which corresponds to an imaging scale of about 1:2.

Having thus fully described the invention, what is claimed as new and desired to be secured by Letters Patents of the United States, is:

1. Macro objective for single lens reflex cameras with focal plane shutters employing a varifocal lens, consisting in the direction of the incoming light of a movable variator of negative power, a stationary erector of positive power, a negative compensator, movable with the variator, an iris stop and a stationary relay system, characterized by the fact that the variator can be moved independently of the compensator for focusing, and that the last lens of the relay has a diameter which is at least 25 percent larger than that of the iris stop, and in which the lens system has the following optical characteristics:

| Lens No. | Radius (R) mm. | Thickness (t), air spacing (s) | Glass Cat. Ref. | Index No. $n_D$ | Dispersion $\nu$ |
|---|---|---|---|---|---|
| VARIATOR | | | | | |
| 17 | $R_1=716.03$<br>$R_2=78.03$ | $t_1=2.50$ | LaF-2 | 1.744 | 44.90 |
| | | $s_1=3.50$ | | | |
| 18 | $R_3=379.86$<br>$R_4=89.03$ | $t_2=2.50$ | LaF-2 | 1.744 | 44.90 |
| | | $s_2=3.50$ | | | |
| 19 | $R_5=465.62$<br>$R_6=118.41$ | $t_3=2.50$ | LaF-2 | 1.744 | 44.90 |
| | | $s_3=1.70$ max. to 16.10 min. | | | |
| ERECTOR | | | | | |
| 22 | $R_7=103.25$<br>$R_8=-38.53$<br>$R_9=-140.37$ | $t_4=7.00$ | LaK-10 | 1.720 | 50.31 |
| | | $t_5=1.50$<br>$s_4=.25$ | SF-18 | 1.7215 | 29.28 |
| 23 | $R_{10}=63.55$<br>$R_{11}=-259.21$ | $t_6=4.00$ | LaK-9 | 1.691 | 54.79 |
| | | $s_5=.25$ | | | |
| 24 | $R_{12}=54.09$<br>$R_{13}=272.04$ | $t_7=4.20$ | LaK-9 | 1.691 | 54.79 |
| | | $s_6=15.43$ max. to 1.03 min. | | | |
| COMPENSATOR | | | | | |
| 27 | $R_{14}=86.41$<br>$R_{15}=-35.64$<br>$R_{16}=-26.29$ | $t_8=4.50$ | SF-18 | 1.7215 | 29.28 |
| | | $t_9=1.50$ | LaK-10 | 1.720 | 50.31 |
| | | $s_7=3.50$ | | | |
| 28 | $R_{17}=-96.50$<br>$R_{18}=-763.85$ | $t_{10}=1.60$ | LaSF-2 | 1.8374 | 43.47 |
| | | $s_8=1.62$ | | | |
| 29 | $R_{19}=-32.28$<br>$R_{20}=-1354.21$ | $t_{11}=1.60$ | LaSF-2 | 1.8374 | 43.47 |
| | | $s_9=1.00$ max. to 15.40 min. | | | |
| IRIS | | | | | |
| | | $s_{9a}=1.00$ | | | |
| RELAY | | | | | |
| 31 | $R_{21}=40.11$<br>$R_{22}=-35.96$ | $t_{12}=5.00$ | BK-7 | 1.52168 | 64.19 |
| | | $s_{10}=1.40$ | | | |
| 32 | $R_{23}=-20.55$<br>$R_{24}=-30.40$ | $t_{13}=2.00$ | SF-18 | 1.7215 | 29.28 |
| | | $s_{11}=.50$ | | | |
| 34 | $R_{25}=24.30$<br>$R_{26}=225.28$ | $t_{14}=4.50$ | SK-16 | 1.6204 | 60.29 |
| | | $s_{12}=3.09$ | | | |
| 35 | $R_{27}=-166.62$<br>$R_{28}=21.44$ | $t_{15}=2.00$ | LaK-10 | 1.720 | 50.31 |
| | | $s_{13}=3.00$ | | | |
| 36 | $R_{29}=111.10$<br>$R_{30}=-25.24$ | $t_{16}=4.50$ | SK-16 | 1.6204 | 60.29 |
| | | $s_{14}=23.00$ | | | |
| 37 | $R_{31}=-34.42$<br>$R_{32}=-68.45$ | $t_{17}=2.00$ | SF-18 | 1.7215 | 29.28 |
| | | $s_{15}=2.40$ | | | |

EFL=50–121.00 mm.
BFL=39.17 mm. $R_1$–$R_{32}$=the surfaces of the lens system in the order of the incident ray In the above table:

LaF=Lanthanum Flint
LaK=Lanthanum Crown
SF=Dense Flint
LaSF=Dense Lanthanum Flint
BK=Borosilicate Crown
SK=Dense Crown

References Cited

UNITED STATES PATENTS 3,094,581  6/1963  Back _____ 350—186
3,207,841  9/1965  Cook _____ 350—186 X
3,259,013  7/1966  Back _____ 350—184

JOHN K. CORBIN, Primary Examiner

U.S. Cl. X.R.

350—187, 206, 214, 215